(12) United States Patent
Kitazawa (10) Patent No.: US 7,463,624 B2
(45) Date of Patent: Dec. 9, 2008

(54) MONITORING CONNECTION STATE BETWEEN MAIN EQUIPMENT AND TERMINAL IN NETWORK TELEPHONE SYSTEM

(75) Inventor: Kenichi Kitazawa, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 283 days.

(21) Appl. No.: 11/294,363

(22) Filed: Dec. 6, 2005

(65) Prior Publication Data

US 2006/0165067 A1     Jul. 27, 2006

(30) Foreign Application Priority Data

Dec. 7, 2004     (JP)     ............... 2004-354512

(51) Int. Cl.
*H04L 12/66*     (2006.01)
(52) U.S. Cl. ...................... 370/352; 370/355
(58) Field of Classification Search ............ 370/229, 370/351–356, 395.52, 433; 379/95.01, 133, 379/142.04, 201.02
See application file for complete search history.

(56) References Cited

U.S. PATENT DOCUMENTS

| 6,625,141 | B1 | 9/2003 | Glitho et al. |
| 2004/0208186 | A1 | 10/2004 | Eichen et al. |
| 2006/0165064 | A1* | 7/2006 | Brown et al. ............ 370/352 |

FOREIGN PATENT DOCUMENTS

| CN | 1534929 | 10/2004 |
| WO | 2005/114906 | 12/2005 |
| WO | 2006-049869 | 5/2006 |

OTHER PUBLICATIONS

Office Action in related foreign application, GB0524210.2 (2 pages), Nov. 8, 2006.
ORCA SCC Softswitch User's Guide, May 2003, pp. 1-62.
ORCA SCC Softswitch User's Guide, Release 8.2, Nuera Communications, Inc., May 2003, pp. 1-62.
Chinese Office Action with English translation, dtd Jun. 6, 2008, in corresponding foreign application, 13 pp.

* cited by examiner

*Primary Examiner*—Suhan Ni
(74) *Attorney, Agent, or Firm*—Pillsbury Winthrop Shaw Pittman LLP (57) ABSTRACT

A main equipment is used in a network telephone system including telephone terminals and the main equipment. The telephone terminals are connected to a communication network to transmit voice packets. The main equipment connects the telephone terminals to one another through the communication network to cause the telephone terminals to communicate with each other. The main equipment includes a communication unit and a detection unit. The communication unit transmits connection confirmation signals to the telephone terminals at different timings, respectively. The connection confirmation signals are defined by a communication protocol on the communication network. The connection confirmation signals are used to confirm connection between the telephone terminals and the main equipment. The detection unit detects presence of one telephone terminal when the one telephone terminal sends back a response signal in response to the transmission of the connection confirmation signals.

14 Claims, 8 Drawing Sheets

MONITORING CONNECTION STATE BETWEEN MAIN EQUIPMENT AND TERMINAL IN NETWORK TELEPHONE SYSTEM

This application is based upon and claims the benefit of priority from the prior Japanese Patent Application No. 2004-354512 filed on Dec. 7, 2004, the entire contents of which are incorporated herein by reference.

BACKGROUND OF THE INVENTION

1. Field of the Invention

The present invention relates to a network telephone system such as an IP (Internet Protocol) telephone system for performing voice communication among telephone terminals through an IP network, and a main equipment and telephone terminals used in the network telephone system.

2. Description of the Related Art

Network telephone systems (IP telephone systems) for transmitting/receiving images or voices as packet data in real time bidirectionally through a packet transmission network have come into wide use in recent years. SIP (Session Initiation Protocol) has been used widely as a protocol of these IP telephone systems.

In this type of system, addresses of terminals (hereinafter referred to as SIP terminals) connected to a packet transmission network are registered in advance in a main equipment on the packet transmission network. When the SIP terminals communicate with each other, the main equipment authenticates the SIP terminals based on the registered addresses.

However, even if failure occurs in the packet transmission network between the main equipment and the SIP terminals, it is impossible to check states of connection between the main equipment and the SIP terminals except the case where call is made from the main equipment side or from the SIP terminal side and the case where the main equipment requests the SIP terminals to make re-registration periodically before expiration of registration. Generally, the main equipment can judge the connection states as long as the terminals connected to the main equipment are digital telephones, standard telephones or IP terminals with Keep-Alive functions. Thus, service can be established when there is an incoming call to a given terminal.

In the case of SIP terminals, it is however impossible for the main equipment to judge presence/absence states of the SIP terminals. Therefore, a method for installing a "Session Timer" relating to Keep Alive based on an SIP terminal standard into SIP terminals has been proposed recently (e.g., see U.S. Pat. No. 6,625,141). It is noted that the "Session Timer" is one of extensions of SIP, but does not refer to actual timers.

SUMMARY OF THE INVENTION

Although the aforementioned method provides a solution by transmitting RE-INVITE or UPDATE messages for Session Timer between the SIP terminals and the main equipment, most of the SIP terminals and the main equipment have not been installed with the Session Timer (standard) yet. Also, when these messages are transmitted to a large number of SIP terminals and the main equipment, load on the packet transmission network increases.

Therefore, the invention provides a network telephone system in which load on a communication network can be lightened and in which presence/absence of terminals and a main equipment can be detected easily regardless of types of the terminals and the main equipment, and also provides a main equipment and telephone terminals used in the network telephone system.

According to one embodiment of the invention, a main equipment is used in a network telephone system including telephone terminals and the main equipment. The telephone terminals are connected to a communication network to transmit voice packets. The main equipment connects the telephone terminals to one another through the communication network to cause the telephone terminals to communicate with each other. The main equipment includes a communication unit and a detection unit. The communication unit transmits connection confirmation signals to the telephone terminals at different timings, respectively. The connection confirmation signals are defined by a communication protocol on the communication network. The connection confirmation signals are used to confirm connection between the telephone terminals and the main equipment. The detection unit detects presence of one telephone terminal when the one telephone terminal sends back a response signal in response to the transmission of the connection confirmation signals.

According to this configuration, the main equipment transmits the connection confirmation signals, which are defined by the communication protocol on the communication network and used to confirm connection between the main equipment and the telephone terminals to the telephone terminals at different timings, respectively. Therefore, a process for detecting presence/absence of the plurality of telephone terminals, which don't provided with Session Timer, can be executed efficiently without occupation of the communication network due to communication of the connection confirmation signals and without concentration of response signals from the plurality of telephone terminals in one time zone.

The main equipment may further include a timer that measures a predetermined time since a transmission timing of each connection confirmation signal. When the one telephone terminal does not send back the response signal in response to the transmission of the connection confirmation signal, the detection unit makes the communication unit re-transmit the connection confirmation signal to the one telephone terminal after the timer has measured the predetermined time.

According to this configuration, even when the one telephone terminal does not send back the response signal in response to the transmission of the connection confirmation signal, the connection confirmation signal is re-transmitted to the one telephone terminal after the timer measures the predetermined time. Therefore, presence of the one telephone terminal can be detected even in the case where the one telephone terminal could not send a response signal back to the main equipment in response to the connection confirmation signal because of temporary failure. Thus, reliability on detection can be improved.

When the one telephone terminal does not send back the response signal in response to the transmission of the connection confirmation signal within another predetermined time since a re-transmission timing of the connection confirmation signal, the detection unit may detect absence of the one telephone terminal.

According to this configuration, the telephone terminal giving no response after the lapse of a long time in spite of re-transmission of the connection confirmation signal can be judged to be absent because the telephone terminal is regarded as being not connected to the communication network.

The communication unit may monitor states of the plurality of telephone terminals and transmits the connection confirmation signal to each idle (i.e., not busy) telephone terminal.

According to this configuration, the connection confirmation signal is transmitted to each idle telephone terminal. Thus, unnecessary use of the communication network can be prevented to improve efficiency in utilization of the communication network.

As described above, according to the above-described configuration, it is possible to provide a network telephone system in which load on a communication network can be lightened and in which presence/absence of terminals and a main equipment can be detected easily regardless of types of the terminals and the main equipment. Also, it is possible to provide a main equipment and telephone terminals used in the network telephone system.

DETAILED DESCRIPTION OF EMBODIMENTS OF THE INVENTION

Embodiments of the invention will be described below in detail with reference to the drawings.

First Embodiment

Figure 1:
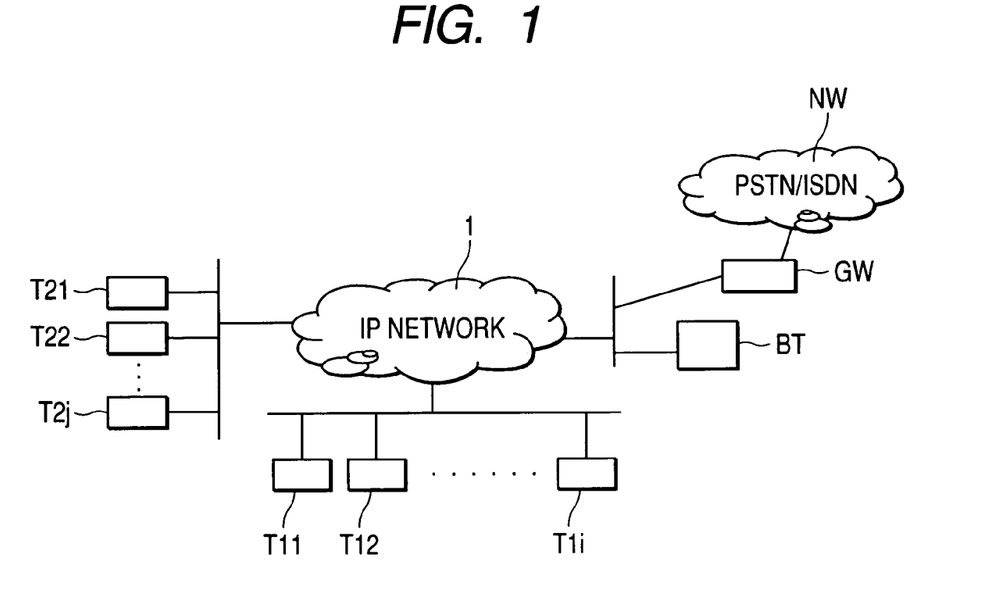
FIG. 1 is a schematic configuration view showing a network telephone system according to a first embodiment of the invention.

FIG. 1 is a schematic configuration view showing a network telephone system according to a first embodiment of the invention.

The system has an IP network 1. A plurality of SIP terminals T1-Ti (i is a natural number) and T21-T2j (j is a natural number) using SIP are connected to the IP network 1. A main equipment BT and a gateway GW are connected to the IP network 1. The main equipment BT has a function of assigning IP addresses to the SIP terminals T11-T1i and T21-T2j, and a function of controlling call to the SIP terminals T11-T1i and T21-T2j. The main equipment BT further has a function of managing the IP addresses assigned to the SIP terminals T11-T1i and T21-T2j.

The gateway GW connects the IP network 1 to a public network NW. The gateway GW has a function of converting the communication protocol and signal format on the IP network 1 into those on the public network NW, and vice versa.

Figure 2:
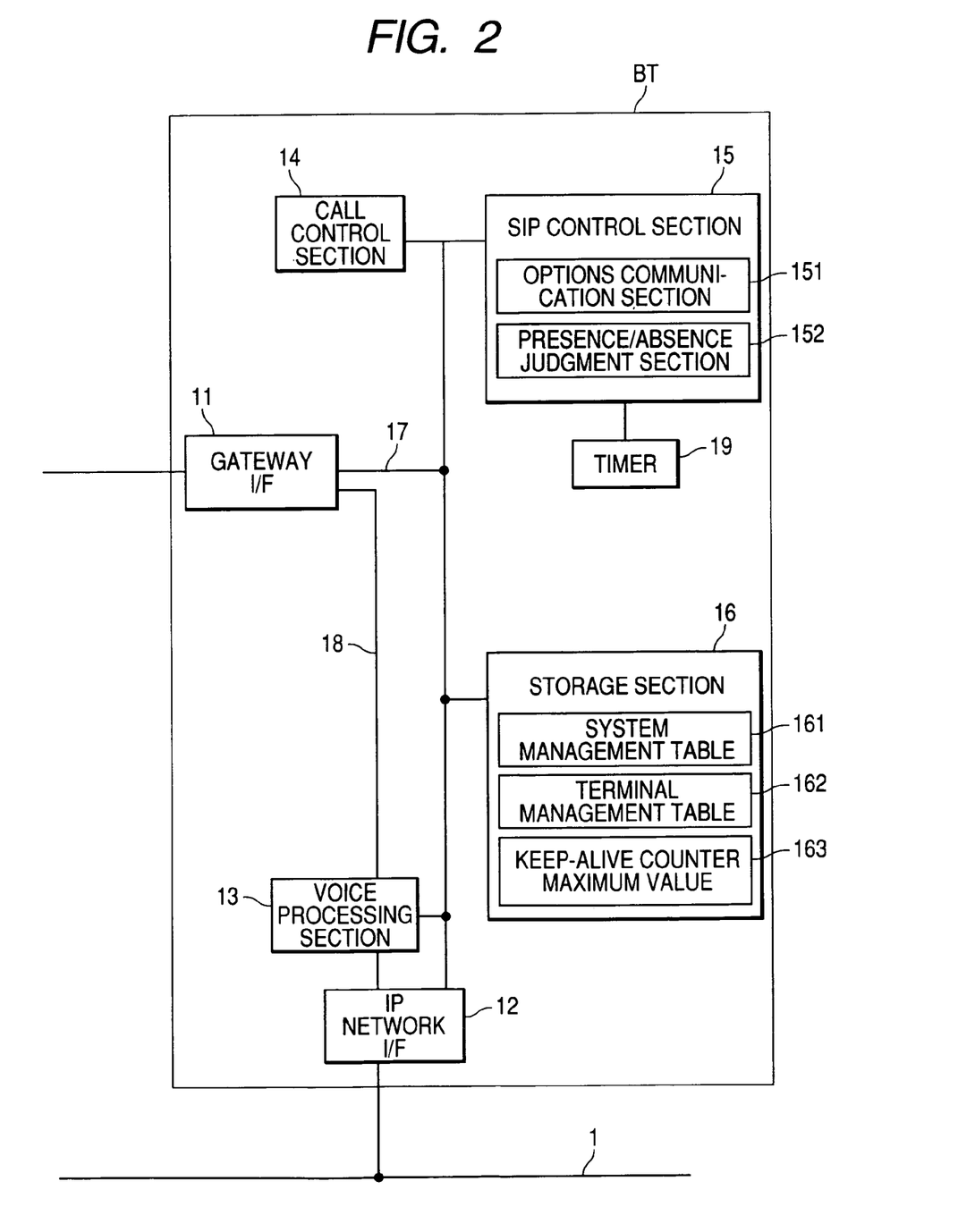
FIG. 2 is a block diagram showing the functional configuration of a main equipment in the first embodiment.

FIG. 2 is a block diagram showing the functional configuration of the main equipment BT according to this embodiment.

The main equipment BT includes a gateway interface (I/F) section 11, an IP network interface (I/F) section 12, a voice processing section 13, a call control section 14, an SIP control section 15, and a storage section 16. The gateway I/F section 11, the IP network I/F section 12, the voice processing section 13, the call control section 14, the SIP control section 15 and the storage section 16 are connected to one another through a data highway 17.

The gateway I/F section 11, the IP network I/F section 12 and the voice processing section 13 are connected to one another through a PCM highway 18.

The gateway GW is connected to the gateway I/F section 11, if necessary. The gateway I/F section 11 performs an interface process between the gateway GW and the PCM highway 18 connected to each other. The gateway I/F section 11 sends/receives various pieces of control information relating to the interface process to/from the call control section 14 through the data highway 17.

The IP network 1 is connected to the IP network I/F section 12, if necessary. The IP network I/F section 12 performs an interface process between the IP network 1 and the PCM highway 18 connected to each other. The IP network I/F section 12 sends/receives various pieces of control information relating to the interface process to/from the call control section 14 through the data highway 17.

The voice processing section 13 has a function of converting each voice packet received from the IP network 1 into a voice signal, which the gateway GW can handle, and transmitting the voice signal to the gateway GW.

The call control section 14 has a CPU, an ROM, an RAM, etc. and controls the respective sections of the main equipment BT by means of software processing.

The SIP control section 15 executes part of the control process executed by the call control section 14. That is, the SIP control section 15 includes a communication section which transmits an OPTIONS message and a section which judges the presence/absence of SIP terminals T11-T1i and T21-T2j. A keep-alive timer 19 is connected to the SIP control section 15.

Figure 3:
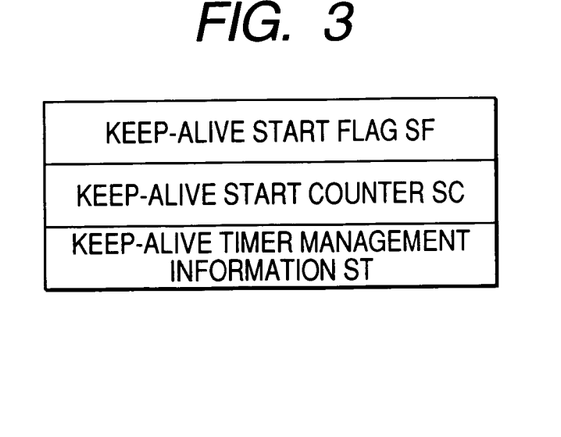
FIG. 3 is a view showing an example of storage contents of a system management table shown in FIG. 2.

The storage section 16 stores routing information necessary for connection control executed by the call control section 14. The storage section 16 also stores a system management table 161, a terminal management table 162, and a keep-alive counter maximum value 163. For example, as shown in FIG. 3, of these tables, the system management table 161 stores a keep-alive start flag SF, a keep-alive start counter SC, and keep-alive timer management information ST.

Figure 4:
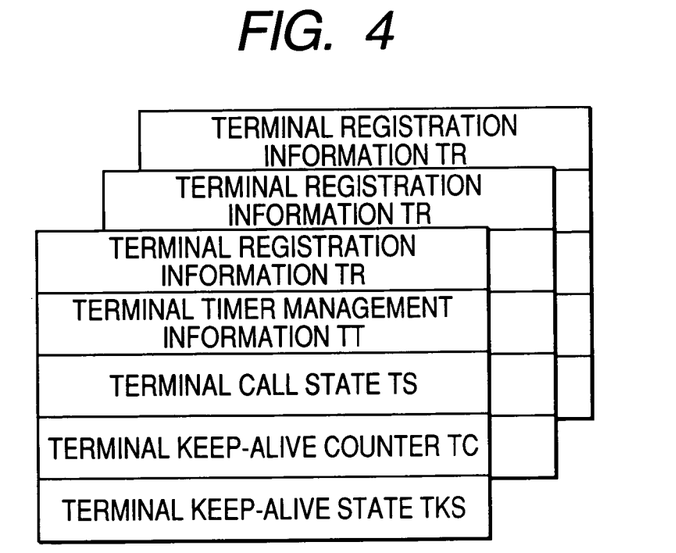
FIG. 4 is a view showing an example of storage contents of a terminal management table shown in FIG. 2.

For example, as shown in FIG. 4, the terminal management table 162 stores terminal registration information TR, terminal timer management information TT, terminal call states TS, terminal keep-alive counters TC and terminal keep-alive states TKS for each of the SIP terminals T11-T1i and T21-T2j.

Figure 5:
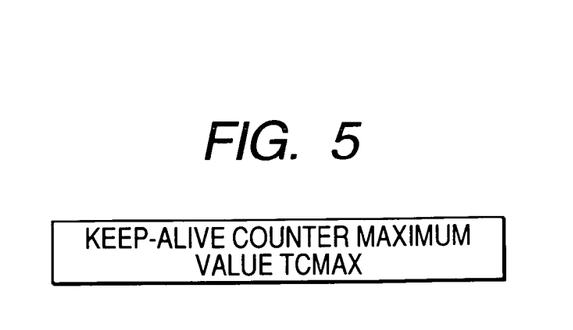
FIG. 5 is a view showing an example of storage contents of a keep-alive counter maximum value shown in FIG. 2.

For example, the keep-alive counter maximum value 163 stores data TCMAX as shown in FIG. 5.

On the other hand, the SIP control section 15 has an OPTIONS communication section 151, and a presence/absence judgment section 152.

The OPTIONS communication section 151 transmits capability query messages (OPTIONS messages) as keep-alive messages to the SIP terminals T11-T1i and T21-T2j on the IP network 1 at intervals of a transmission time set in the timer 19 and at different transmission timings stored in the terminal management table 162. The OPTIONS communication section 151 is adapted to receive response messages (200 OK) from the SIP terminals T11-T1i and T21-T2j in response to the OPTIONS messages. Incidentally, error messages other than 200 OK may be used instead as long as the messages indicate some responses.

The presence/absence judgment section 152 monitors whether or not the 200 OK messages are sent back from the SIP terminals T11-T1i and T21-T2j in response to transmission of the OPTIONS messages. The presence/absence judgment section 152 makes a judgment on the basis of monitored results as to whether the SIP terminals T11-T1i and T21-T2j are present or not. The presence/absence judgment section 152 notifies the call control section 14 of results of the judgment. When the timer 19 counts the keep-alive counter maximum value while at least one of the 200 OK messages is not sent back after transmission of the OPTIONS message, the presence/absence judgment section 152 gives an instruction to the OPTIONS communication section 151 to transmit the OPTIONS message again, for example, to the SIP terminal T12 from which the 200OK message has not been sent back.

Next, a processing operation in the aforementioned configuration will be described.

Figure 6:
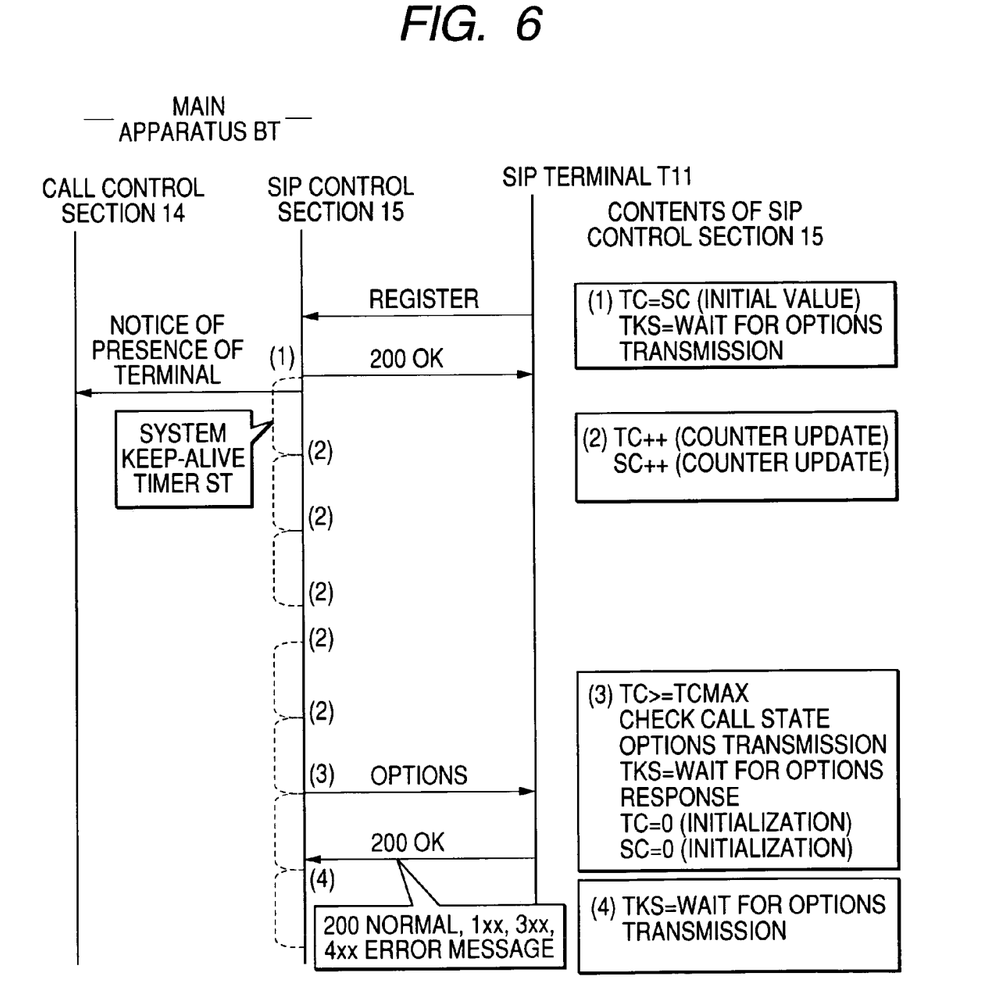
FIG. 6 is a view of a transmission sequence of an OPTIONS message in the first embodiment.

For example, upon receiving a registration request message "REGISTER", for example, from the SIP terminal T11 as shown in FIG. 6, the main equipment BT registers and sets necessary registration information TR in the terminal management table 162 and sends a response "200 OK" back to the SIP terminal T11.

The SIP control section 15 of the main equipment BT sends a terminal presence notice indicating "presence of terminal" to the call control section 14. On this occasion, the SIP control section 15 judges whether the keep-alive timer start flag SF stored in the system management table 161 is set or not. If the timer is not started, the SIP control section 15 starts the timer 19 in accordance with the keep-alive timer management information ST. On this occasion, the SIP control section 15 registers and sets necessary timer management information in the terminal management table 162 while associating the necessary time management information with the SIP terminal T11. Incidentally, when the timer 19 has already been started, the timer 19 continues to work.

Next, the SIP control section 15 acquires the system keep-alive counter SC from the system management table 161 and sets the acquired system keep-alive counter SC into the terminal keep-alive counter TC of the SIP terminal T11 in the terminal management table 162. The timing when the keep-alive counter TC becomes equal to the keep-alive counter maximum value TCMAX varies depending on each terminal because the system keep-alive counter SC successively updated is set in the terminal keep-alive counter TC. Thus, the timings of transmitting the OPTIONS message to the terminals are different from each other and distributed.

Figure 7:
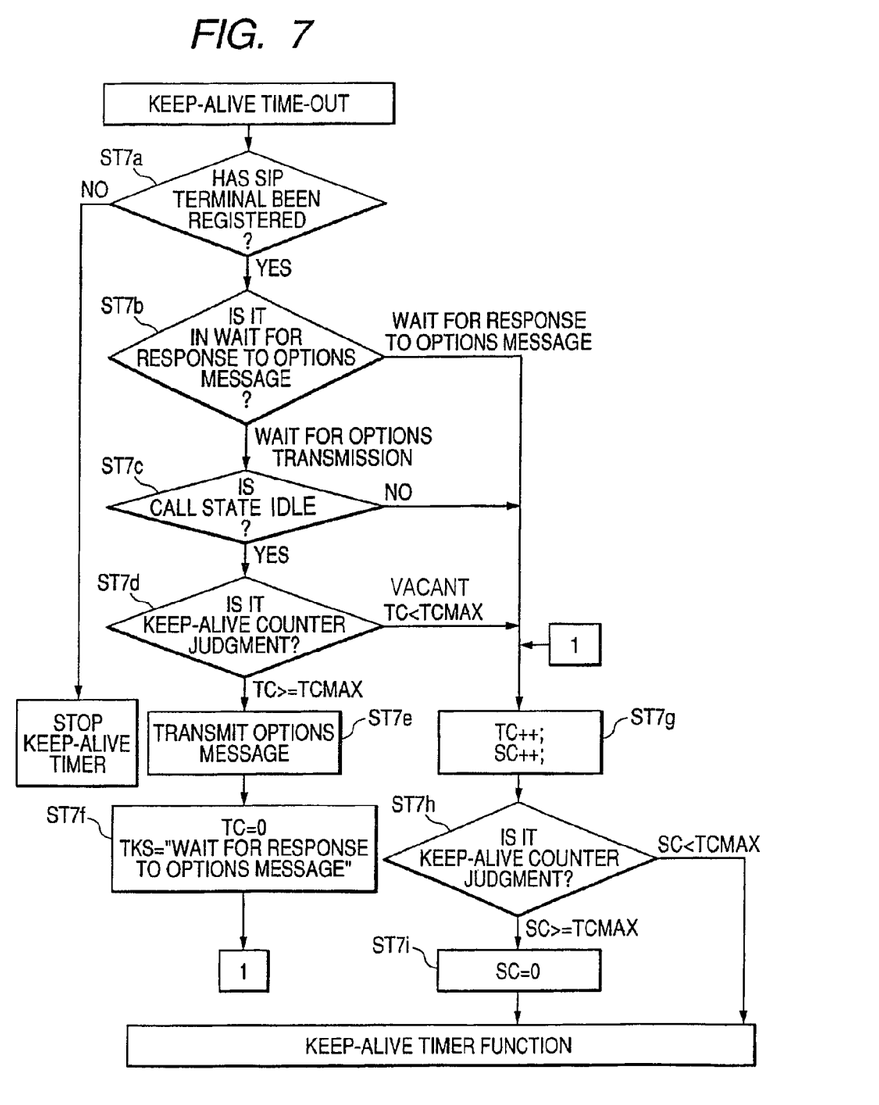
FIG. 7 is a flow chart showing a procedure of processing in the main equipment at the time of transmission of the OPTIONS message in the first embodiment.

When the timer 19 is time out, the SIP control section 15 executes a procedure shown in FIG. 7. First, the SIP control section 15 judges whether the SIP terminal T11 has been registered or not (Step ST7a). When the SIP terminal T11 has been already registered, the SIP control section 15 further judges whether the main equipment BT is waiting for a response to OPTIONS message from the SIP terminal T11 (Step ST7b).

Here, when the step ST7b indicates "wait for the OPTIONS transmission", the SIP control section 15 judges whether the call state TS of the SIP terminal T11 is idle or not (Step ST7c). When the call state TS of the SIP terminal T11 is idle the SIP control section 15 judges whether the terminal keep-alive counter TC exceeds the keep-alive counter maximum value TCMAX or not (Step ST7d).

Here when the terminal keep-alive counter TC is equal to the keep-alive counter maximum value TCMAX, the SIP control section 15 transmits an OPTIONS message to the SIP terminal T11 (Step ST7e). Then, the SIP control section 15 resets the terminal keep-alive counter TC in the terminal management table 162 and updates the terminal keep-alive state TKS to "wait for a response to the OPTIONS message" (Step ST7f).

On the other hand, when the terminal keep-alive counter TC does not exceed the keep-alive counter maximum value TCMAX in the Step ST7d, the SIP control section 15 updates the terminal keep-alive counter TC in the terminal management table 162 and the system keep-alive counter SC in the system management table 161 (by incrementing them by +1) (Step ST7g). When the system keep-alive counter SC then becomes equal to the keep-alive counter maximum value TCMAX in the Step ST7h, the SIP control section 15 resets the system keep-alive counter SC (Step ST7i).

Incidentally, when the SIP terminal T11 is waiting for the response to the OPTIONS message in the Step ST7b or when the SIP terminal T11 is busy in the Step ST7c, the SIP control section 15 goes to the processing in the Step ST7g.

Figure 8:
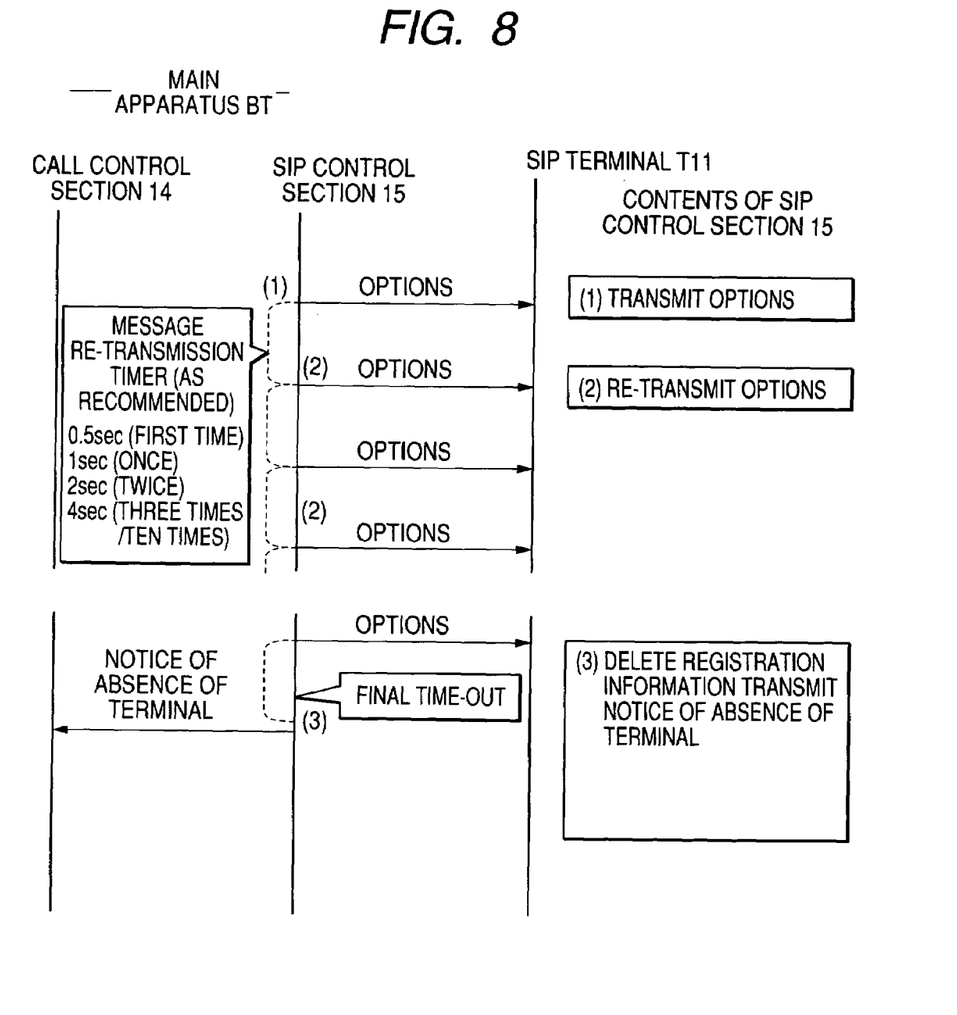
FIG. 8 is a view of a non-response sequence to the OPTIONS message in the first embodiment.

When there is no response from the SIP terminal T11, the SIP control section 15 sets terminal timer management information TT in the terminal management table 162 and performs a retry process of transmitting the OPTIONS message again in accordance with the SIP as shown in FIG. 8. The retry process conforms to the SIP standard protocol.

Figure 9:
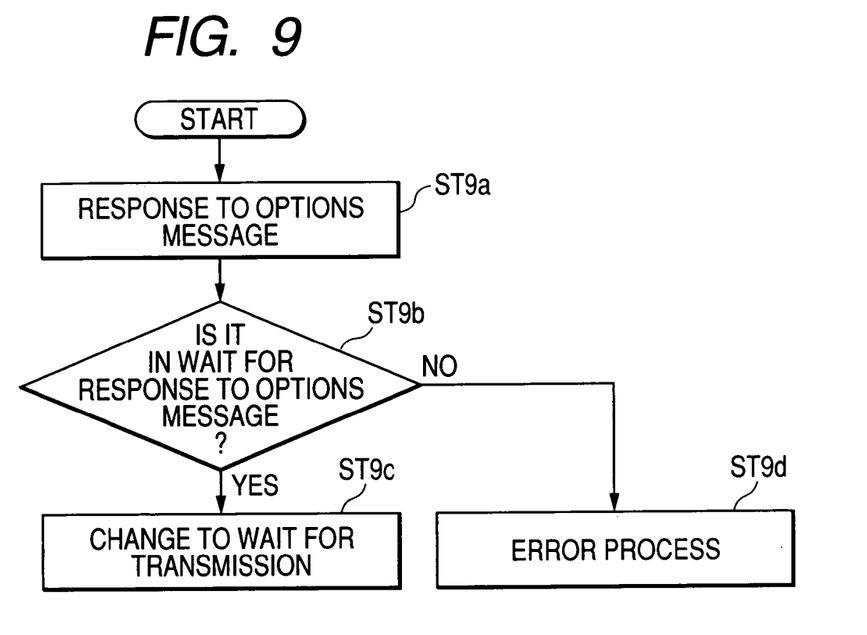
FIG. 9 is a flow chart showing a procedure of processing in the main equipment when a response is sent back in response to the re-transmitted OPTIONS message in the first embodiment.

Incidentally, when there is some response (normal or error) from the SIP terminal T11 in response to the OPTIONS message (Step ST9a) in FIG. 9, the SIP control section 15 decides "presence of terminal" and then judges whether the terminal keep-alive state TKS in the terminal management table 162 indicates "wait for a response to OPTIONS message" or not (Step ST9b).

Here, when the terminal keep-alive state TKS indicates "wait for response to OPTIONS message" (Yes) the SIP control section 15 updates the terminal keep-alive state TKS in the terminal management table 162 to "wait for the OPTIONS transmission" (Step ST9c) On the other hand, when the terminal keep-alive state TKS indicates "wait for the OPTIONS transmission" (No) the SIP control section 15 sends an error message to the SIP terminal T11 (Step ST9d).

Figure 10:
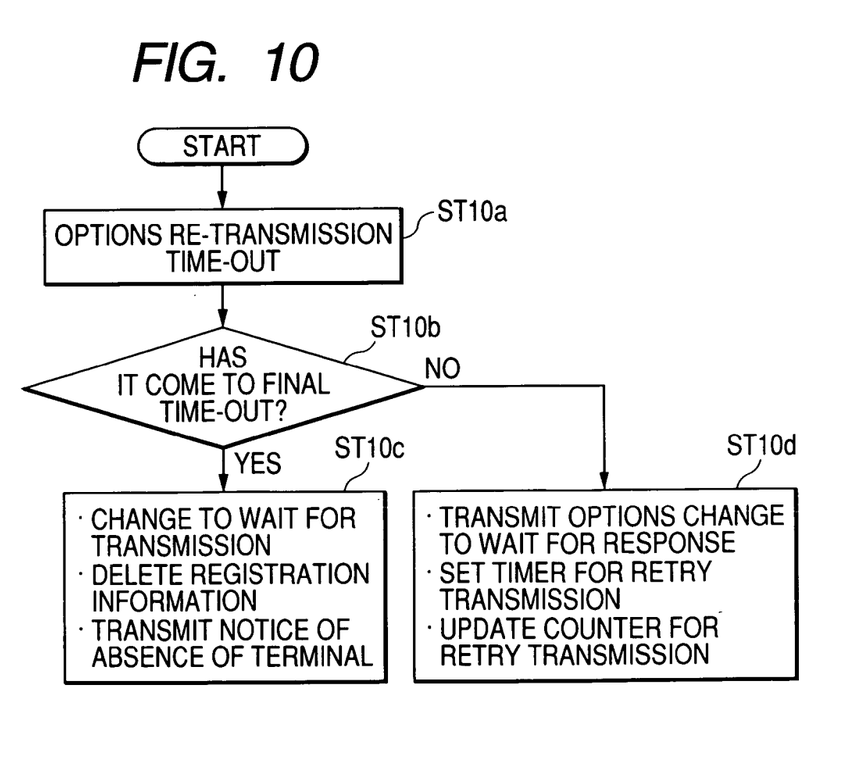
FIG. 10 is a flow chart showing a procedure of processing in the main equipment when a response is not sent back in response to the re-transmitted OPTIONS message in the first embodiment.

During the retry process, the SIP control section 15 executes a procedure shown in FIG. 10 to judge whether it comes to the final time-out whenever the timer 19 is time out (Step ST10b) Here, when it comes to the final time-out without reception of any response from the SIP terminal T11 (Yes), the SIP control section 15 deletes the terminal registration information TR associated with the SIP terminal T11 from the terminal management table 162 and sends a terminal absence notice to the call control section 14 (Step ST10c).

On the other hand, when it has not come to the final time-out (No), the SIP control section 15 transmits an OPTIONS message to the SIP terminal T11, updates the terminal keep-alive state TKS in the terminal management table 162 to "wait for response to OPTIONS message", sets the timer for retry transmission and updates the counter for retry transmission (Step ST10d).

As described above, the first embodiment has shown the case where OPTIONS messages defined based on the SIP are transmitted from the main equipment BT to the SIP terminals T11 to T1i and T21 to T2j at different timings, respectively and responses are received from the SIP terminals T11 to T1i and T21 to T2j to thereby execute a detection process for detecting presence/absence of the SIP terminals T11-T1i and T21-T2j, which aren't provided with Session Timer.

Accordingly, the detection process for detecting presence/absence of the SIP terminals T11-T1i and T21-T2j can be executed efficiently regardless of the type of each SIP terminal without occupation of the IP network 1 by transmission of the OPTIONS messages and without concentration of response signals from the SIP terminals T11-T1i and T21-T2j in one time zone.

In the first embodiment, when there is no response signal from the SIP terminal T11 in response to the OPTIONS message, a retrial is made to transmit the OPTIONS message to the SIP terminal T11 after the timer 19 measures a predetermined time. Thus, the main equipment BT can still detect presence of the SIP terminal T11 even in the case where the SIP terminal T11 could not send the response signal in response to the OPTION message because of a temporary failure. Thus, reliability on detection can be improved.

In addition, in the first embodiment, when there is no response from the SIP terminal T12 though the final time-out has been counted by the timer 19 in the case where the OPTIONS message is transmitted again, the main equipment BT immediately decides that the SIP terminal T12 is absent.

Further, in the first embodiment, the SIP control section 15 of the main equipment BT is designed to send OPTIONS messages only to terminals which are decided to be idle, such as the SIP terminals T11 and T14-Ti. Thus, it is possible to prevent unnecessary use of the IP network 1. As a result, it is possible to lighten load on the IP network 1 more greatly.

Second Embodiment

Figure 11:
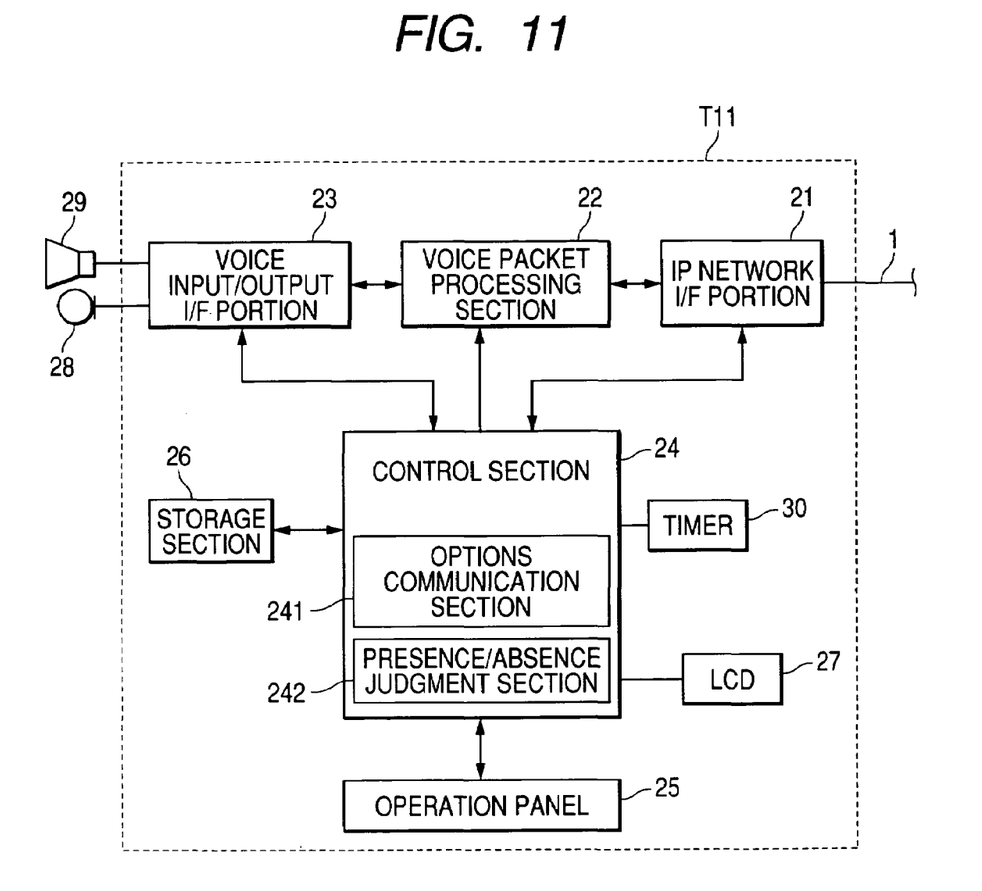
FIG. 11 is a block diagram showing the functional configuration of an SIP terminal according to a second embodiment of the invention.

FIG. 11 is a block diagram showing the functional configuration of the plurality of SIP terminals T11-T1i and T21-T2j according to a second embodiment of the invention. The following description will be made on the SIP terminal T11.

The SIP terminal T11 has an IP network interface (I/F) section 21, a voice packet processing section 22, a voice input/output interface (I/F) section 23, a control section 24, an operation panel 25, a storage section 26, and a display section 27.

The IP network I/F section 21 performs an interface operation relating to the IP network 1. That is, the IP network I/F section 21 extracts voice packets and control data from transmission packets received from the IP network 1 and provides the voice packets and control data to the voice packet processing section 22 and the control section 24, respectively. The IP network I/F section 21 also transmits voice packets given from the voice packet processing section 22 and data given from the control section 24 to the IP network 1.

The voice packet processing section 22 converts the voice packets given from the IP network I/F section 21 into analog receiver voice signals and provides the analog receiver voice signals to the voice input/output I/F section 23. The voice pocket processing section 22 also converts transmitter voice signals supplied from the voice input/output I/F section 23 into voice packets, which the IP network 1 can handle, and provides the voice packets to the IP network I/F section 21.

A microphone 28 and a speaker 29 are connected to the voice input/output I/F section 23. The voice input/output I/F section 23 inputs the transmitter voice signals supplied from the microphone 28 to the voice packet processing section 22 and outputs the receiver voice signals supplied from the voice packet processing section 22 as amplified voice from the speaker 29.

The control section 24 controls respective sections of the SIP terminal T11 by means of software processing and performs a process for communicating with the IP network 1.

The operation panel 25 has key switches for accepting various instructions given from the user to the control section 24. The display section 27 includes an LCD or the like for notifying the user of various kinds of information.

A system management table, a main equipment management table and a keep-alive counter maximum value as described in the first embodiment are stored in the storage section 26.

Incidentally, the control section 24 has an OPTIONS communication section 241, and a presence/absence judgment section 242. The OPTIONS communication section 241 transmits an OPTIONS message as a keep-alive message to the main equipment BT on the IP network 1 at an interval of a transmission time set in a timer 30 and receives a response message (200 OK) from the main equipment BT in response to the OPTIONS message. Incidentally, the timing for transmitting the OPTIONS message from the respective SIP terminals T11-T1i and T21-T2j are different from each other.

The presence/absence judgment section 242 monitors whether or not a 200 OK message is sent back from the main equipment BT in response to transmission of the OPTIONS message. The presence/absence judgment section 242 makes a judgment on the basis of the monitored result as to whether the main equipment BT is present or not. When the timer 30 counts the keep-alive counter maximum value while there is no response message from the main equipment BT after transmission of the OPTIONS message, the presence/absence judgment section 242 gives an instruction to the OPTIONS communication section 241 to transmit the OPTIONS message to the main equipment BT again. When the timer 30 further counts the predetermined time-out, the presence/absence judgment section 242 decides absence of the main equipment BT and displays a result of the judgment on the display section 27.

As described above, in the second embodiment, the process for making a judgment on the basis of the OPTIONS message as to whether the main equipment BT is present or not, is performed in the respective SIP terminals T11-T1i and T21-T2j at different timings from each other. Therefore, the process for making the judgment of presence/absence is not performed by only the main equipment BT, but the main equipment BT can cooperate with the SIP terminals T11-T1i and T21-T2j to perform the process for making judgment of presence/absence efficiently. As a result, reliability on detection of presence/absence of the main equipment BT and the SIP terminals T11-T1i and T21-T2j connected to the IP network 1 can be improved more greatly. Moreover, because the main equipment BT cooperates with the SIP terminals T11-T1i and T21-T2j to perform the judgment process, the processing load imposed on the main equipment BT can be lightened.

Other Embodiments

Incidentally, the invention is not limited to the aforementioned embodiments. For example, each of the aforementioned embodiments has shown the case where an OPTIONS message is used for judging presence/absence of each SIP terminal or the main equipment. The invention is not limited to this example. For example, a RE-INVITE or UPDATE message for Session Timer may be used instead.

Various modifications can be made on the configuration and kind of the system, the configuration and kind of the main equipment, the configuration and kind of each SIP terminal, the transmitting/receiving procedure of the OPTION message, the presence/absence judgment process, etc. without departing from the gist of the invention.

What is claimed is:

1. A main equipment used in a network telephone system including a plurality of telephone terminals connected to a communication network to transmit voice packets, the main equipment connecting the plurality of telephone terminals to one another through the communication network to cause the telephone terminals to communicate with each other, the main equipment comprising:
   a communication unit configured to transmit connection confirmation signals to the telephone terminals at different timings, respectively, and to monitor states of the telephone terminals, the connection confirmation signals defined by a communication protocol on the communication network, the connection confirmation signals used to confirm connection between the telephone terminals and the main equipment; and
   a detection unit that detects present telephone terminals when the telephone terminals send back a response signal in response to the transmission of the connection confirmation signals,
   wherein the communication unit only transmits the connection confirmation signals to telephone terminals that are in the idle state.

2. The main equipment according to claim 1, further comprising:
   a timer that measures a predetermined time since a transmission timing of each connection confirmation signal, wherein:
   when the one telephone terminal does not send back the response signal in response to the transmission of the connection confirmation signal, the detection unit makes the communication unit re-transmit the connection confirmation signal to the one telephone terminal after the timer has measured the predetermined time.

3. The main equipment according to claim 2, wherein when the one telephone terminal does not send back the response signal in response to the transmission of the connection confirmation signal within another predetermined time since a re-transmission timing of the connection confirmation signal, the detection unit detects absence of the one telephone terminal.

4. The main equipment according to claim 1, wherein the communication protocol is Session Initiation Protocol.

5. A network telephone system comprising:
   a plurality of telephone terminals connected to a communication network to transmit voice packets;
   a main equipment connecting the plurality of telephone terminals to one another through the communication network to cause the telephone terminals to communicate with each other;
   a communication unit configured to transmit and receive connection confirmation signals between the main equipment and the telephone terminals at different timings according to the telephone terminals and to monitor states of the telephone terminals, the connection confirmation signals defined by a communication protocol on the communication network, the connection confirmation signals used to confirm connection between the main equipment and the telephone terminals; and
   a detection unit that detects presence of the main equipment and presence of the telephone terminals based on a result of the transmission and reception,
   wherein the communication unit only transmits the connection confirmation signals to telephone terminals that are in the idle state.

6. The network telephone system according to claim 5, wherein:
   the communication unit transmits the connection confirmation signals from the main equipment to the plurality of telephone terminals sequentially at different timings, respectively; and
   when the one telephone terminal sends back a response signal to the main equipment in response to the transmission of the connection confirmation signal, the detection unit detects presence of the one telephone terminal.

7. The network telephone system according to claim 5, wherein:
   the communication unit transmits the connection confirmation signals from the plurality of telephone terminals to the main equipment sequentially at different timings, respectively; and
   when the main equipment sends back a response signal to the telephone terminals in response to the transmission of the connection confirmation signal, the detection unit detects the presence of the main equipment.

8. The network telephone system according to claim 5, further comprising:
   a timer that measures a predetermined time since a transmission timing of each connection confirmation signal, wherein
   when no response signal is sent back in response to the transmission of one of the connection confirmation signals, the detection unit makes the communication unit re-transmit the connection confirmation signal after the timer measures the predetermined time.

9. The network telephone system according to claim 8, wherein
   when one telephone terminal or the main equipment to which the connection confirmation signal has been transmitted does not send back the response signal within another predetermined time since a re-transmission timing of the connection confirmation signal, the detection unit detects absence of the one telephone terminal or the main equipment.

10. The network system according to claim 5, wherein the communication protocol is Session Initiation Protocol.

11. A method for confirming presence of each telephone terminal on a communication network for transmitting voice packets, the method comprising:
   transmitting connection confirmation signals to the plurality of telephone terminals at different timings, respectively, the connection confirmation signals defined by a communication protocol on the communication network, the connection confirmation signals used to confirm connection between the telephone terminals and the main equipment;
   monitoring states of the telephone terminals; and
   detecting presence of one telephone terminal when the one telephone terminal sends back a response signal in response to the transmission of the connection confirmation signals, wherein the connection confirmation signal is transmitted and re-transmitted to the one telephone terminal whose state is idle.

12. The method according to claim 11, further comprising:
when the one telephone terminal does not send back the response signal in response to the transmitting of the connection confirmation signal, re-transmitting the connection confirmation signal to the one telephone terminal after the predetermined time has elapsed since the transmitting of the connection confirmation signal to the one telephone terminal.

13. The method according to claim 12, further comprising:
when the one telephone terminal does not send back the response signal in response to the transmission of the connection confirmation signal within another predetermined time since the re-transmitting of the connection confirmation signal, determining that the one telephone terminal is absent.

14. The method according to claim 11, wherein the communication protocol is Session Initiation Protocol.

* * * * *